United States Patent [19]

Shinbori et al.

[11] 4,456,232
[45] Jun. 26, 1984

[54] APPARATUS FOR CONTROLLING FRICTION BETWEEN LEAF SPRINGS OF A LAMINATED LEAF SPRING ASSEMBLY

[75] Inventors: Takeyoshi Shinbori, Yokosuka; Susumu Matsuoka, Atsugi, both of Japan

[73] Assignee: NHK Spring Co., Ltd., Yokohama, Japan

[21] Appl. No.: 395,970

[22] Filed: Jul. 7, 1982

[51] Int. Cl.³ .............................................. B60G 11/02
[52] U.S. Cl. ..................................... 267/54 B; 267/18; 280/718
[58] Field of Search .................... 267/7, 9 R, 18, 24, 267/31, 36 A, 48, 54 B, 54 C, 89, 90, 82, 158; 280/710, 714, 718

[56] References Cited

U.S. PATENT DOCUMENTS 3,294,390 12/1966 Warmkessel .......................... 267/18
4,022,449 5/1977 Estorff ................................. 267/48

FOREIGN PATENT DOCUMENTS 55-93747 6/1980 Japan .
56-80536 7/1981 Japan .
56-87643 7/1981 Japan .

Primary Examiner—Bruce H. Stoner, Jr.
Assistant Examiner—Robert J. Oberleitner
Attorney, Agent, or Firm—Frishauf, Holtz, Goodman and Woodward

[57] ABSTRACT

An apparatus for controlling friction between the leaf springs of a laminated leaf spring assembly comprises a clamp. The clamp includes a spring supporting member and a pressure member which clamp the laminated leaf spring assembly therebetween. The apparatus further comprises a hydraulic cylinder for pressing the pressure member to urge the laminated leaf spring assembly against the spring supporting member. The pressure of a pressurized fluid supplied to the hydraulic cylinder is controlled by a control valve of a hydraulic control member. The operating pressure of the control valve is controlled by detecting values of predetermined factors of a body to be supported by a detector and supplying predetermined signals to the control valve in accordance with the detected values.

7 Claims, 4 Drawing Figures

APPARATUS FOR CONTROLLING FRICTION BETWEEN LEAF SPRINGS OF A LAMINATED LEAF SPRING ASSEMBLY

BACKGROUND OF THE INVENTION

The present invention relates to a method and an apparatus for controlling friction between the leaf springs of a laminated leaf spring assembly in accordance with the state of a body to be supported.

A laminated leaf spring assembly including a number of leaf springs has been widely used for suspending a body to be supported, for example, the body of a vehicle. When the laminated leaf spring assembly is used for suspending the vehicle, the comfort, the driving stability and the like are influenced by the spring constant, the friction between the leaf springs of the assembly and the like. The degree of such influence depends on the vehicle speed, the condition of the road surface and the like. In general, when the vehicle runs on a smooth road, the smaller the friction acting on the opposing surfaces of each pair of adjacent leaf springs, that is, the friction between the leaf springs, the better becomes the comfort. On the other hand, a higher driving stability is attained when the friction between the leaf springs is large. The comfort is considered to be more important than the driving stability on the smooth road, since sufficient driving stability is ensured if a steering wheel is not suddenly turned.

A laminated leaf spring assembly including a number of tapered leaf springs has been proposed. The tapered leaf springs are decreased in thickness toward the ends. The weight of the laminated leaf spring assembly including such a construction is smaller than that including leaf springs of the constant thickness since the number of the former may be smaller than that of the latter. If the number of the leaf springs is smaller than that of the prior art laminated leaf spring assembly, the friction between the leaf springs is reduced. As a result, a shock absorber of a large capacity is required to improve the comfort on a rough road. However, such a shock absorber of a large capacity is expensive. In addition, the comfort is sometimes impaired, since the shock absorber provides constant damping even if the damping is not needed. Therefore, clamping means is used for clamping the leaf springs near the ends thereof in the direction of their thickness to increase the friction between the leaf springs. The conventional clamping means securely clamps the leaf springs by bolts. As a result, the friction between the leaf springs is maintained at a large value so that the comfort on the rough road is improved. However, the comfort on the smooth road is unsatisfactory.

SUMMARY OF THE INVENTION

It is therefore an object of the present invention to provide a method and an apparatus for controlling friction between the leaf springs of a laminated leaf spring assembly in which the friction between the leaf springs is optimized by varying it in accordance with the state of a body to be supported.

In order to achieve the object described above, according to the present invention, the method for controlling friction between the leaf springs of the laminated leaf spring assembly is that values of predetermined factors of a body to be supported on which the laminated leaf spring assembly is mounted are detected, signals corresponding to the detected values are supplied to hydraulic cylinder means to control the operating pressure of the hydraulic cylinder means and a force of a pressure member which is connected to a free end of a piston of the hydraulic cylinder means and which clamps the laminated leaf spring assembly in cooperation with a spring supporting member of the clamping means in the direction of thickness of the laminated leaf spring assembly is controlled by the operating pressure of the hydraulic cylinder means.

According to another aspect of the present invention, an apparatus for controlling friction between a plurality of stacked leaf springs of a laminated leaf spring assembly comprises clamping means mounted on the laminated leaf spring for supporting a body to be supported and mounted at both ends on the body for clamping the laminated leaf spring assembly in the direction of thickness thereof, the clamping means including a supporting member and a pressure member for clamping the laminated leaf springs therebetween. The apparatus further comprises hydraulic cylinder means for urging the pressure means of the clamping means to urge the laminated leaf spring assembly to the supporting member of the clamping means, said hydraulic cylinder means including a cylinder, and a piston vertically movably arranged in the cylinder and connected at the free end to the pressure member of the clamping means, hydraulic control means arranged between a fluid source and the hydraulic cylinder means for controlling the pressure of the pressurized oil supplied from the fluid source to the dydraulic cylinder means, and detector means for detecting values of predetermined factors of the body to be supported to feed predetermined signals for controlling the pressure of the pressurized oil at the hydraulic control means in response to the values.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENTS

Figure 1:
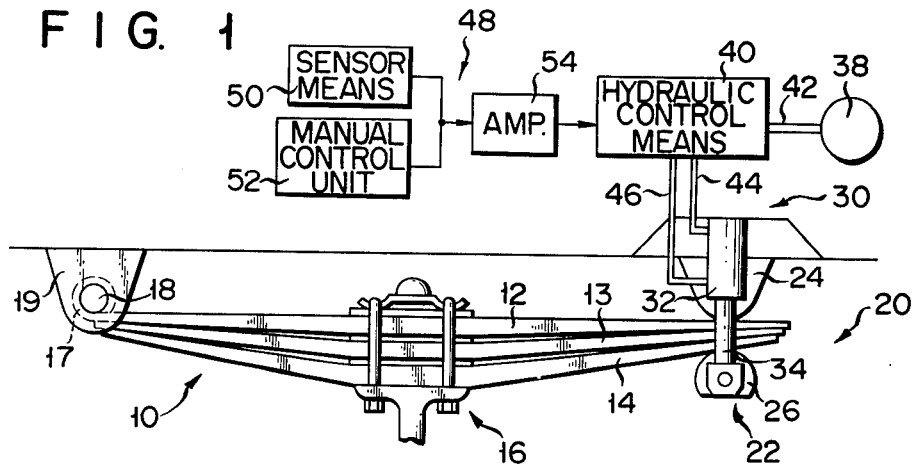
FIGS. 1 and 2 are front views of apparatuses for controlling friction between the leaf springs of laminated leaf spring assemblies according to the first and second embodiments of the present invention, respectively.

Referring to FIG. 1, a laminated leaf spring assembly 10 includes a plurality of, for example three, leaf springs 12, 13 and 14. In this embodiment, the leaf springs 12, 13 and 14 are formed as tapered leaf springs. However, they are not limited to tapered leaf springs and may be partially tapered leaf springs or leaf springs of a constant thickness. The leaf springs 12, 13 and 14 may be of different lengths and be laminated in a stepped form. The laminated leaf spring assembly 10 is clamped at the center by a U-bolt assembly 16 in the direction of its thickness as in the prior art. If the laminated leaf spring assembly 10 is used for suspending a vehicle body, it is connected to a rear axle (not shown) of the vehicle body through the U-bolt assembly 16, for example. Spring eye 17 is integrally formed at the left end of the main or uppermost leaf spring 12. The spring eye 17 is movably attached to a bracket 19 of the vehicle body by a shackle pin 18, for example.

Figure 2:
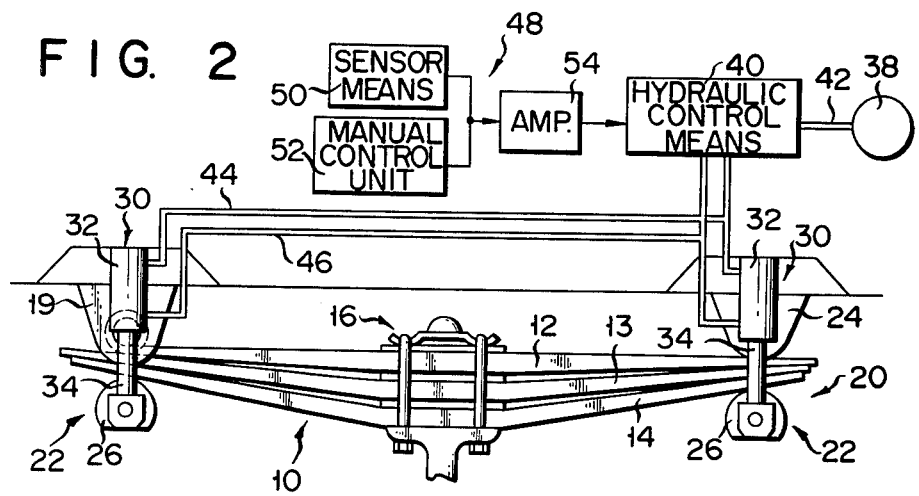

An apparatus 20 for controlling friction between the leaf springs of the laminated leaf spring assembly 10 comprises clamping means 22 disposed at the right end of the laminated leaf spring assembly 10. But as shown in FIG. 2, the clamping means 22 may be arranged at the both ends of the assembly 10. The clamping means 22 serves to clamp the leaf springs 12, 13 and 14 in the direction of their thickness and to permit the sliding movement of the leaf springs relative to each other.

The clamping means 22 comprises a spring supporting member 24 which can abut against the lower surface of the leaf spring 14, and a pressure member 26 for pressing against the upper surface of the leaf spring 12. The spring supporting member 24 is mounted on the vehicle body.

A hydraulic cylinder means 30 is mounted on the clamping means 22. The hydraulic cylinder means 30 comprises a cylinder 32 and a piston 34 which is vertically movably arranged in the cylinder. The pressure member 26 is mounted on the free end of the piston 34. The hydraulic cylinder 30 is constructed in a double acting type, but it may be constructed in a single acting type. In the single acting hydraulic cylinder means 30, the piston 34 is returned by a return spring to the initial position.

A pressurized oil from a fluid source 38 is supplied through hydraulic control means 40 including a control valve or the like into the cylinder 32 of the hydraulic cylinder means 30. The operating pressure of the pressurized oil is controlled by the hydraulic control means 40. Reference numerals 42, 44, 46 represent ducts. Detector means 48 for detecting values of predetermined factors of a body to be supported, feeding predetermined signals responsive to the values to the hydraulic control means 40 and controlling the operating pressure of the pressurized oil is connected to the hydraulic control means 40. The detector means 48 comprises sensor means 50, a manual control unit 52 and an amplifier 54. The sensor means 50 comprises a number of sensors capable of generating signals relative to all or parts of predetermined factors of the vehicle movement, for example, the vertical or horizontal acceleration, the angular acceleration, the vehicle speed, the steering angle of the steering wheel and so forth. The manual control unit 52 is constructed to generate a desired signal adapted for the need of the driver or the load conditions instead of the automatic detection with the sensor means 50 or to complement automatic control. The amplifier 54 is constructed to produce a control signal for controlling the operating pressure of the hydraulic control means 40 in response to the input signal from the sensor means 50 or the manual control unit 52.

In the apparatus for controlling the friction between the leaf springs of the constructed described above, when the vertical vibration of the vehicle body increases, for example, on the rough road, the vertical sensor of the sensor means 50 generates a signal corresponding to the vibration, which signal is supplied to the amplifier 54. A control signal from the amplifier 54 is in turn applied to the hydraulic control means 40 to control the operating pressure of the control valve of the hydraulic control means 40, thereby controlling the pressure of the pressurized oil supplied from the fluid source 38 through the duct 44 and the hydraulic control means 40 to the hydraulic cylinder means 30. The piston 34 is moved upwardly in FIG. 1 by the pressurized oil, the pressure member 26 thus urges the lower surface of the leaf spring 14, and the leaf springs 12, 13, 14 are interposed with the spring supporting member 24. Therefore, the friction between the leaf springs 12, 13, 14 increases, the attenuating force of the vibration at the laminated leaf spring 10 accordingly increases, and the comfort can be improved in this manner.

When the vertical vibration is small on the smooth road, the friction between the leaf springs can be reduced by the reverse sequence of the above operations, and the good comform can be obtained.

When the steering wheel is turned at the high speed running time, the apparatus is controlled to increase the friction between the leaf spring in response to the output signals from the respective sensors, for example, for the running speed and the steering angle of the steering wheel. When the friction between the leaf springs is thus increased, even if the static spring constant at the laminated leaf spring assembly 10 is constant, the dynamic spring constant at the laminated leaf spring assembly is substantially increased, and the driving stability can accordingly be improved.

Figure 3:
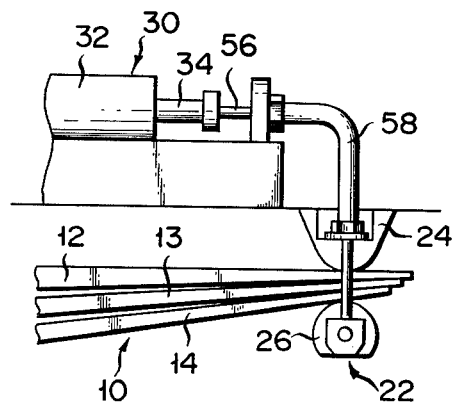
FIGS. 3 and 4 are partial front views of apparatuses for controlling friction between the leaf springs of laminated leaf spring assemblies according to the third and fourth embodiments of the present invention, respectively.
Figure 4:
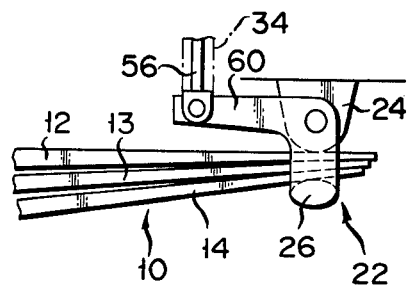

In the foregoing construction of the apparatus for controlling the friction between the leaf springs, the pressure member 26 is moved directly by the hydraulic cylinder means 30. Alternatively, as shown in FIG. 3, the pressure member 26 may be moved indirectly via a cable 56. In the construction of the indirect movement, the mounting position of the hydraulic cylinder means 30 may be determined with wide degree of freedom. The cable 56 is guided by a guide tube 58. With such a construction, a plurality of clamping means 22 may be driven by a single hydraulic cylinder means 30. Further, as shown in FIG. 4, the pressure member 26 is mounted on one end of a rotatable lever 60, and the other end of the lever may be connected to the cable 56. In addition, the other end of the lever 60 may also be connected directly to the piston 34. With the construction with the lever 60, a large force can be produced at the pressure member 26 by the principle of a lever, and the friction between the leaf springs can be controlled widely.

What we claim is:

1. An apparatus for controlling friction between a plurality of stacked leaf springs of a laminated leaf spring assembly, comprising:

clamping means mounted on the laminated leaf spring assembly for supporting a body to be supported and mounted at both ends on the body for clamping the laminated leaf spring assembly in the direction of thickness thereof, said clamping means including a supporting member and a pressure member for clamping the laminated leaf spring assembly therebetween, hydraulic cylinder means for urging the pressure member of said clamping means to urge the laminated leaf spring assembly to the supporting member of said clamping means, said hydraulic cylinder means including a cylinder, and a piston vertically movably arranged in the cylinder and connected at a free end thereof to the pressure member of said clamping means, hydraulic control means arranged between a fluid source and said hydraulic cylinder means for controlling the pressure of pressurized fluid supplied from the fluid source to the hydraulic cylinder means, and detector means for detecting values of predetermined factors of the body to be supported to feed predetermined signals which are a function of the detected values for controlling the pressure of the pressurized fluid at said hydraulic control means in response to the detected values.

2. The apparatus according to claim 1, further comprising a rotatably L-shaped member, the pressure member of said clamping means being mounted on one end of said rotatable L-shaped member, and the piston of said hydraulic cylinder means being connected to the other end of said rotatable L-shaped member.

3. The apparatus according to claim 1 or 2, wherein the piston is coupled to the pressure member.

4. A method for controlling friction between a plurality of stacked leaf springs of a laminated leaf spring assembly supporting a body, the method comprising:

detecting values of predetermined factors of a body to be supported on which said laminated leaf spring assembly is mounted;

generating signals corresponding to the detected values and supplying said signals to hydraulic cylinder means to control the operating pressure of the hydraulic cylinder means, the hydraulic cylinder means including a piston having a free end;

clamping said laminated leaf spring assembly by a clamping means including a pressure member and a spring supporting member between which said leaf spring is clamped, said pressure member being coupled to said free end of said piston of said hydraulic cylinder means; and applying a force to said pressure member via said piston of said hydraulic cylinder means to which it is coupled, said pressure member clamping said laminated leaf spring assembly in cooperation with said spring supporting member of said clamping means in the direction of thickness of said laminated leaf spring assembly, said force being a function of the operating pressure of said hydraulic cylinder means which is controlled by said signals.

5. The apparatus according to claim 1, wherein said fluid of said fluid source is oil.

6. The apparatus according to claim 1, wherein said body to be supported is a vehicle, and wherein said detector means detects at least one of the vertical acceleration, horizontal acceleration, angular acceleration, vehicle speed and steering angle of the vehicle.

7. The method according to claim 4, wherein said body supported by said leaf spring assembly is a vehicle, and wherein said step of detecting said values of predetermined factors of said body comprises detecting at least one of the vertical acceleration, horizontal acceleration, angular acceleration, vehicle speed and steering angle of the vehicle.

* * * * *